United States Patent
Russke

(10) Patent No.: US 7,909,385 B2
(45) Date of Patent: Mar. 22, 2011

(54) CONVERTIBLE VEHICLE

(75) Inventor: Klaus Russke, Bissendorf (DE)

(73) Assignee: Wilhelm Karmann GmbH, Osnabruck (DE)

( * ) Notice: Subject to any disclaimer, the term of this patent is extended or adjusted under 35 U.S.C. 154(b) by 0 days.

(21) Appl. No.: 10/531,680

(22) PCT Filed: Oct. 10, 2003

(86) PCT No.: PCT/DE03/03368
§ 371 (c)(1),
(2), (4) Date: Nov. 7, 2005

(87) PCT Pub. No.: WO2004/037584
PCT Pub. Date: May 6, 2004

(65) Prior Publication Data
US 2006/0131922 A1    Jun. 22, 2006

(30) Foreign Application Priority Data
Oct. 17, 2002   (DE) .................................. 102 48 347

(51) Int. Cl.
*B60J 7/14* (2006.01)
(52) U.S. Cl. ............... 296/108; 296/220.01; 296/107.17; 296/107.07
(58) Field of Classification Search ............. 296/107.17, 296/220.01, 108, 116, 107.07
See application file for complete search history.

(56) References Cited

U.S. PATENT DOCUMENTS

| | | | | |
|---|---|---|---|---|
| 4,729,592 A | * | 3/1988 | Tuchiya et al. ............... | 296/116 |
| 5,542,735 A | * | 8/1996 | Furst et al. ................ | 296/107.18 |
| 5,749,617 A | * | 5/1998 | Weissrich et al. ........ | 296/107.19 |
| 5,979,970 A | * | 11/1999 | Rothe et al. ............... | 296/107.17 |
| 6,053,560 A | * | 4/2000 | Rothe ........................... | 296/108 |
| 6,467,832 B2 | * | 10/2002 | Schutt et al. .............. | 296/107.08 |
| 6,572,175 B2 | * | 6/2003 | Schutt et al. .................. | 296/108 |
| 6,676,191 B2 | * | 1/2004 | Hasselgruber et al. .. | 296/107.17 |
| 2003/0042751 A1 | * | 3/2003 | Antreich .................. | 296/107.17 |

FOREIGN PATENT DOCUMENTS

| | | |
|---|---|---|
| DE | 44 11 388 | 5/1995 |
| DE | 296 20 492 | 5/1998 |
| DE | 197 52 068 | 5/1999 |
| DE | 101 33 957 | 2/2003 |
| DE | 102 42 751 | 4/2003 |
| EP | 0 844 125 | 5/1998 |
| FR | 2 694 245 | 2/1994 |
| FR | 2 696 375 | 4/1994 |

OTHER PUBLICATIONS

Patent Abstracts of Japan, vol. 1995, No. 06, Jul. 31, 1995 & JP 07 069071 A (Mitsubishi Motors Corp), Mar. 14, 1995.

* cited by examiner

*Primary Examiner* — Dennis H Pedder
(74) *Attorney, Agent, or Firm* — Lucas & Mercanti, LLP; Klaus P. Stoffel

(57) ABSTRACT

The invention relates to a convertible vehicle (1) provided with a roof (2) which comprises at least one rigid rear part (3) provided with a rear screen (4) and displaceable, independent of a roof area (5) which is arranged therebefore, in the direction of travel (F). The inventive convertible vehicle is characterized in that the roof area (5) arranged before the rear part (3) in the direction of travel (F) comprises at least two parts of the roof (6, 7) which are arranged in tandem when the roof is closed, displaceable at least partially on each other in order to be opened and can be stored is said connected position in the body (8).

10 Claims, 11 Drawing Sheets

CONVERTIBLE VEHICLE

The invention concerns a convertible with a roof that comprises at least one rigid rear roof part in accordance with the introductory clause of Claim 1.

FR 2 693 956 describes a convertible with two rigid roof parts, one of which is a rear roof part that encloses a rear window, while the other is a front roof part that is essentially horizontal when the roof is closed. The two roof parts can be moved into the automobile body in different lowered positions in such a way that a landau top is obtained by lowering only the rear roof part, a targa top is obtained by lowering only the front roof part, and a full convertible is obtained by lowering both roof parts. However, in its lowered position, the front roof part protrudes upward over the belt line of the automobile body and thus obstructs the view to the rear. Furthermore, this adversely affects the air resistance and the visual appearance of the vehicle. In addition, the airflow causes large forces to act on a roof part mounted in this way, which promotes wear of the mechanical mechanisms of the roof.

The invention is based on the problem of creating a convertible that allows a high degree of useful flexibility of the roof opening.

The invention solves this problem with a convertible with the features of Claim 1. Advantageous modifications of the invention are specified in dependent Claims 2 to 10.

In accordance with the invention, the extent of the lowered front roof section is reduced in at least one direction perpendicular to its transverse extent. This results in favorable stowed dimensions of the lowered roof parts, so that, for example, in the case of essentially vertical lowering of these roof parts, they can be held below the belt line of the automobile body. The thickness of the lowered front roof section is also small due to this nesting of the roof parts.

The essentially vertical lowering of the roof parts causes minimal restriction of the longitudinal extent of a luggage compartment adjacent to the stowing section of the roof and is therefore especially advantageous.

If the front roof parts can be moved independently of the rear roof part, the flexibility of the roof opening is increased. It is possible, for example, to select as the driving position not only a full convertible position with all of the roof parts lowered, but also a targa position with the roof parts of the front roof section lowered.

If the front roof section comprises exactly two roof parts, and the first roof part can be moved over the second roof part to achieve partial opening, then it is also possible to open just the first roof part, so that assort of sunroof function is obtained, which further increases the flexibility of the roof opening.

The invention can be used both in vehicles with exclusively rigid roof parts and in vehicles in which the front roof section forms a textile-based frame construction.

If a convertible with several individually movable roof parts is provided with a computer program that allows a desired roof position to be input and then determines the current state of the roof position and a route by which the desired roof position can be achieved, then the operator does not have to give a thought to how he will go about changing the roof parts from their current position to their desired position without causing obstruction of the roof movement or damage of the roof parts.

The program advantageously determines the fastest route from the current state to the preselected desired state and automatically controls the necessary drives.

Other advantages and features of the invention are apparent from the specific embodiment of the object of the invention that is illustrated in the drawings and described below.

FIG. 1 shows a schematic representation of a two-seat convertible 1. A convertible with a larger number of seats is also possible in accordance with the invention.

Figure 1:
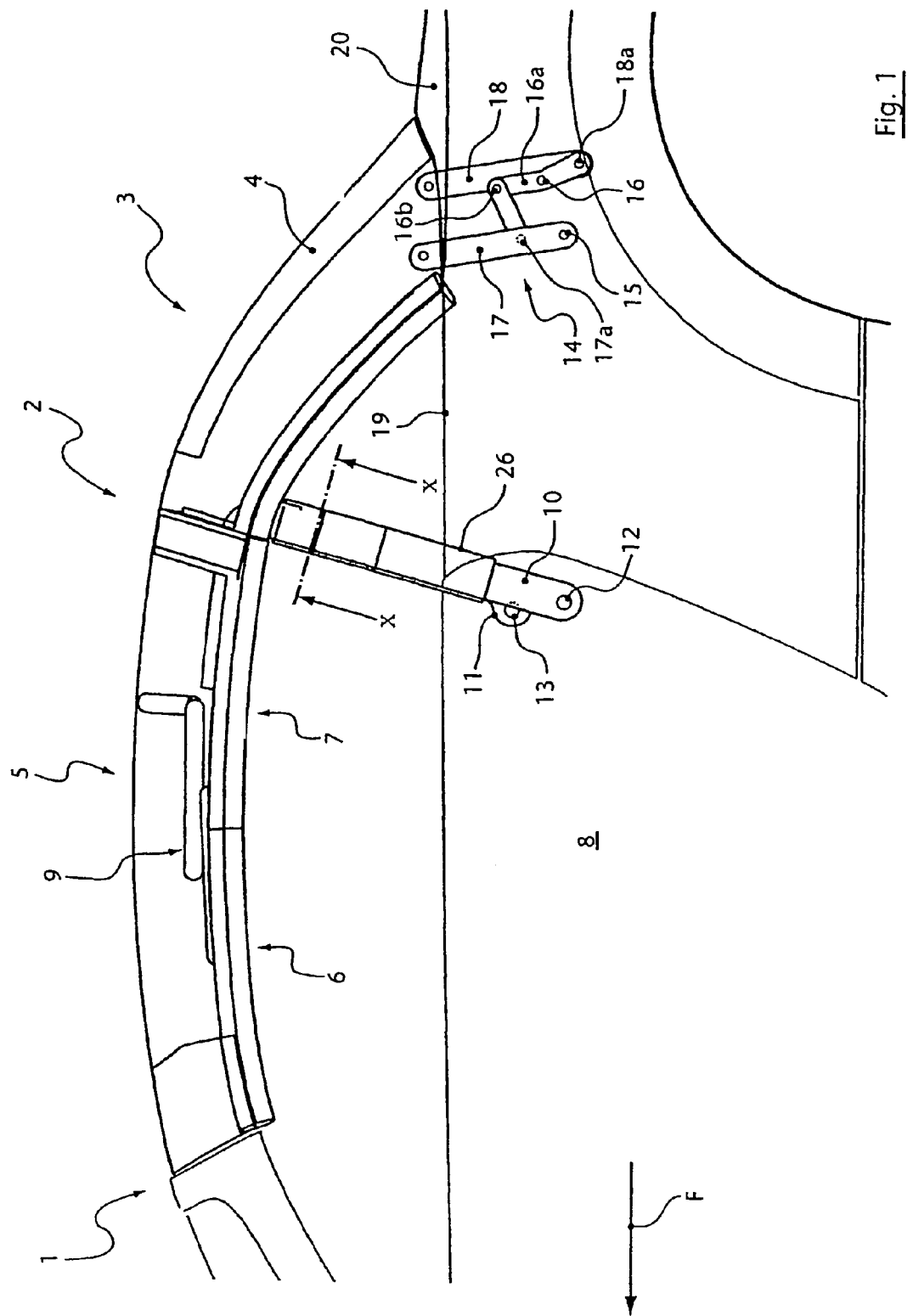
FIG. 1 shows a convertible of the invention in a schematic side view that is broken off below and at the front, with the roof closed

The vehicle 1 comprises a movable roof, which is labeled as a whole with 2. The roof 2 comprises a rear roof part 3, i.e., a roof part that is located at the rear relative to the direction of travel F, with a flexible or, especially, rigid rear window 4, which can be made, for example, of plastic or, advantageously, glass. In this embodiment, the rear roof part 3 is constructed as a rigid roof part and consists, for example, of steel, a light metal, a metallic foam material, or plastic. It is also possible for the rear roof part 3 to be formed essentially only of a rear window 4 that is curved like an arch.

In addition, the roof 2 comprises a front roof section 5, which, in the closed state, is arranged in front of the rear roof part 3 in the direction of travel F of the vehicle. The front roof section 5 contains at least two (in the illustrated embodiment, exactly two) roof parts 6, 7, which lie one behind the other when the roof is closed and are movable relative to each other and relative to the body 8 of the convertible 1. When the roof is closed, the front roof part 6 is supported on the windshield frame, and the roof parts 6, 7 are flush with each other. The roof parts 6, 7 can be designed either as rigid parts or as units covered with a textile material.

Figure 2:
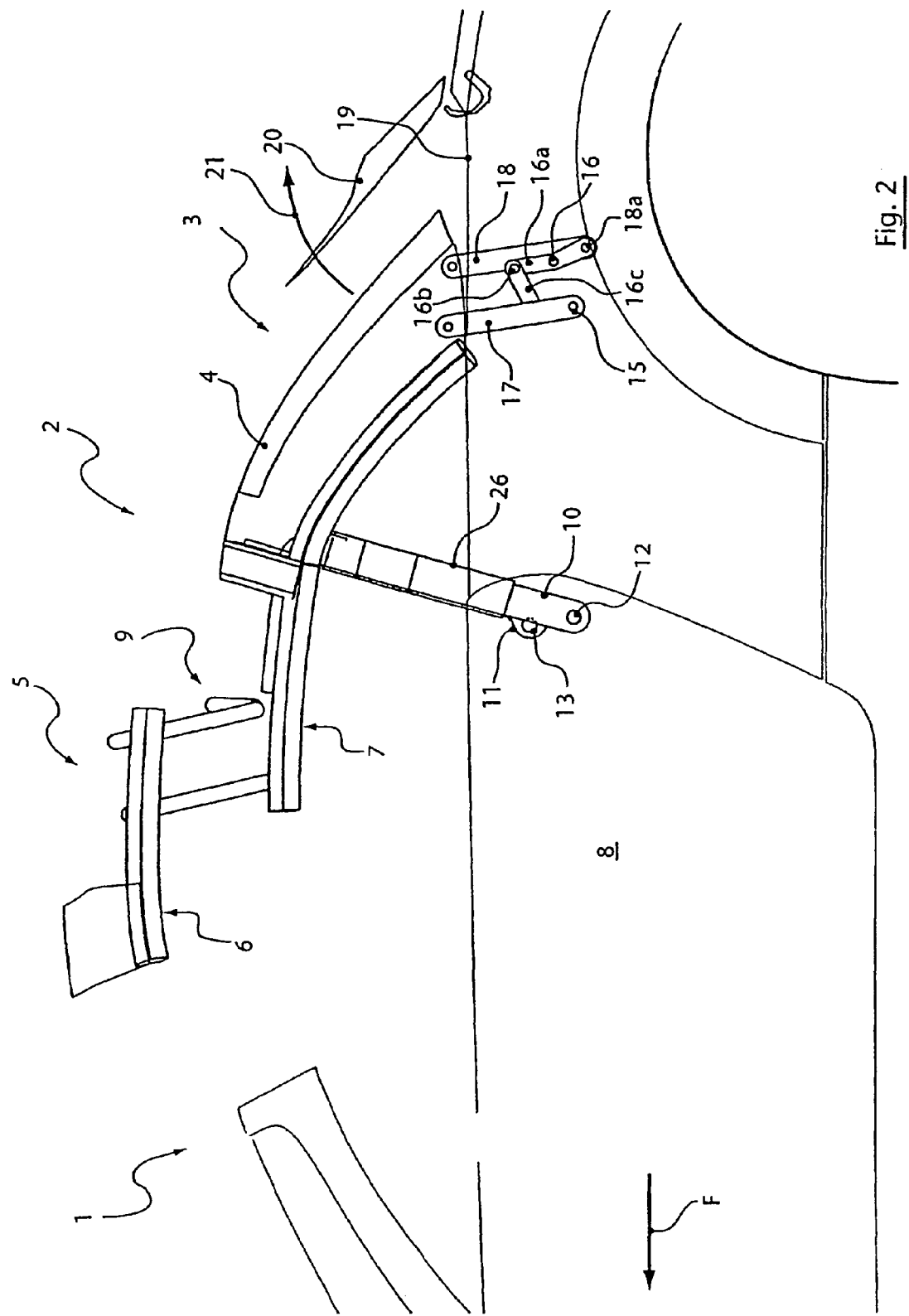
FIG. 2 shows a view similar to that of FIG. 1 during the movement of the roof parts of the front roof section one over the other with simultaneous opening of a rear cover of the folding-top compartment for initiating the opening of all of the roof parts.
Figure 3:
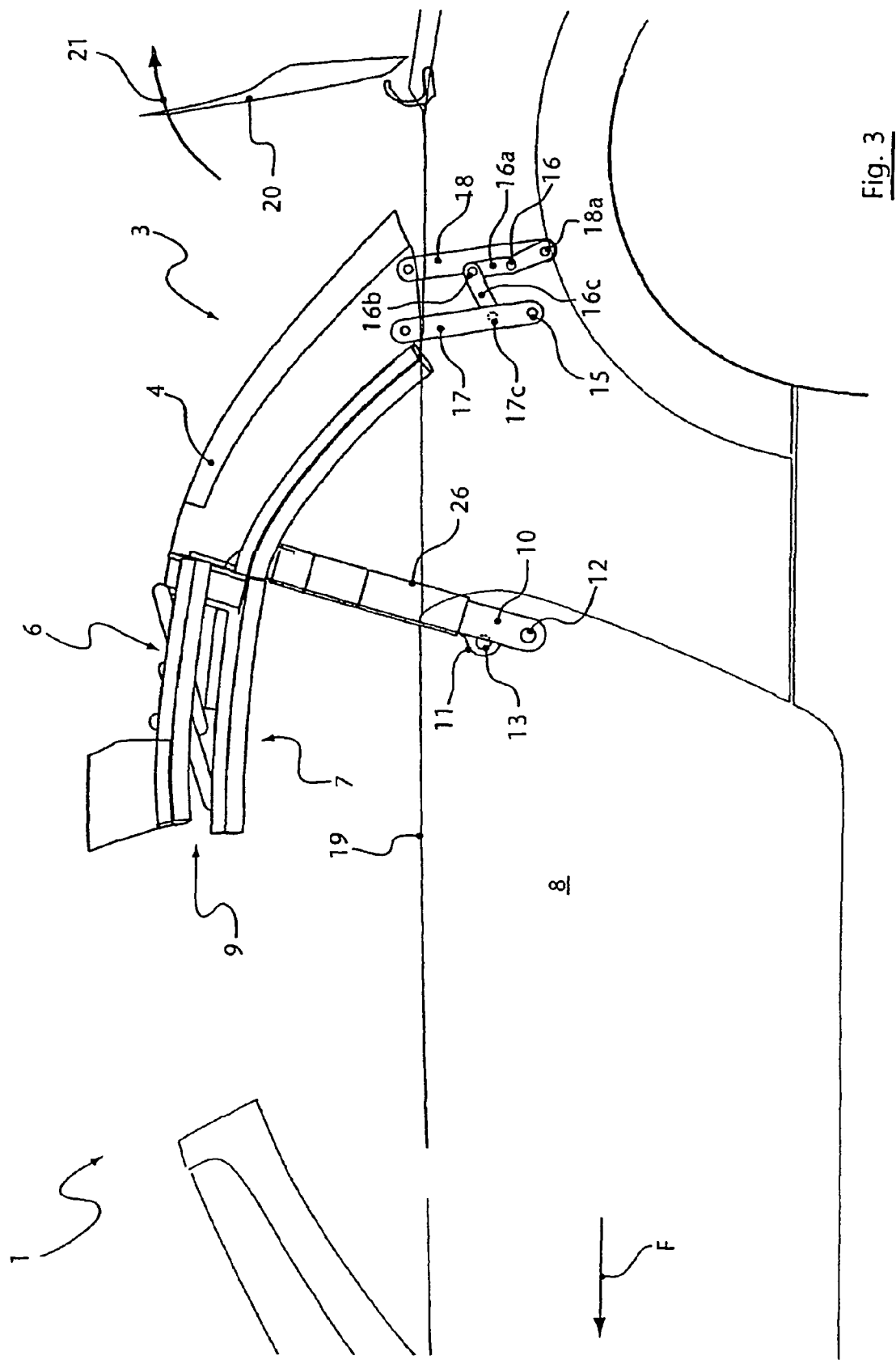
FIG. 3 shows a view similar to that of FIG. 2 with the roof parts of the front roof section moved one over the other and with the cover of the folding-top compartment completely opened.

To allow the roof parts 6, 7 to be moved, they are connected with each other by a four-bar linkage 9 in such a way that the front roof part 6 can be displaced essentially parallel over the roof part 7 behind it (FIG. 2, FIG. 3). In addition, the roof parts 6, 7 are connected with the automobile body 8 and can be moved into and out of it by means of lateral swivel arms 10, 11, which can be swiveled towards the rear about bearings 12, 13 that are fixed with respect to the automobile body.

The rear roof part 3 is connected with the automobile body 8 by a multijoint linkage 14, which comprises two links 17, 18 that can be swiveled towards the rear about pivot joints 15, 16, which are fixed with respect to the automobile body and have horizontal pivot axes. The rear link 18 with respect to the direction of travel F can be moved only indirectly about the pivot joint 16, which is fixed with respect to the automobile body, and is connected by an intermediate link 16a, which acts on the link 18 at the joint 18a. The intermediate link 16a is supported approximately in the middle on joint 16, and the end of the intermediate link 16a that is located at the opposite end from the link 18 is operatively connected with another intermediate link 16c by means of a joint 16b. Intermediate link 16c acts on the link 17 by means of the movable pivot joint 17a. In this way, the movements of the links 17 and 18 are coupled by means of the intermediate linkage 16a, 16c.

Figure 4:
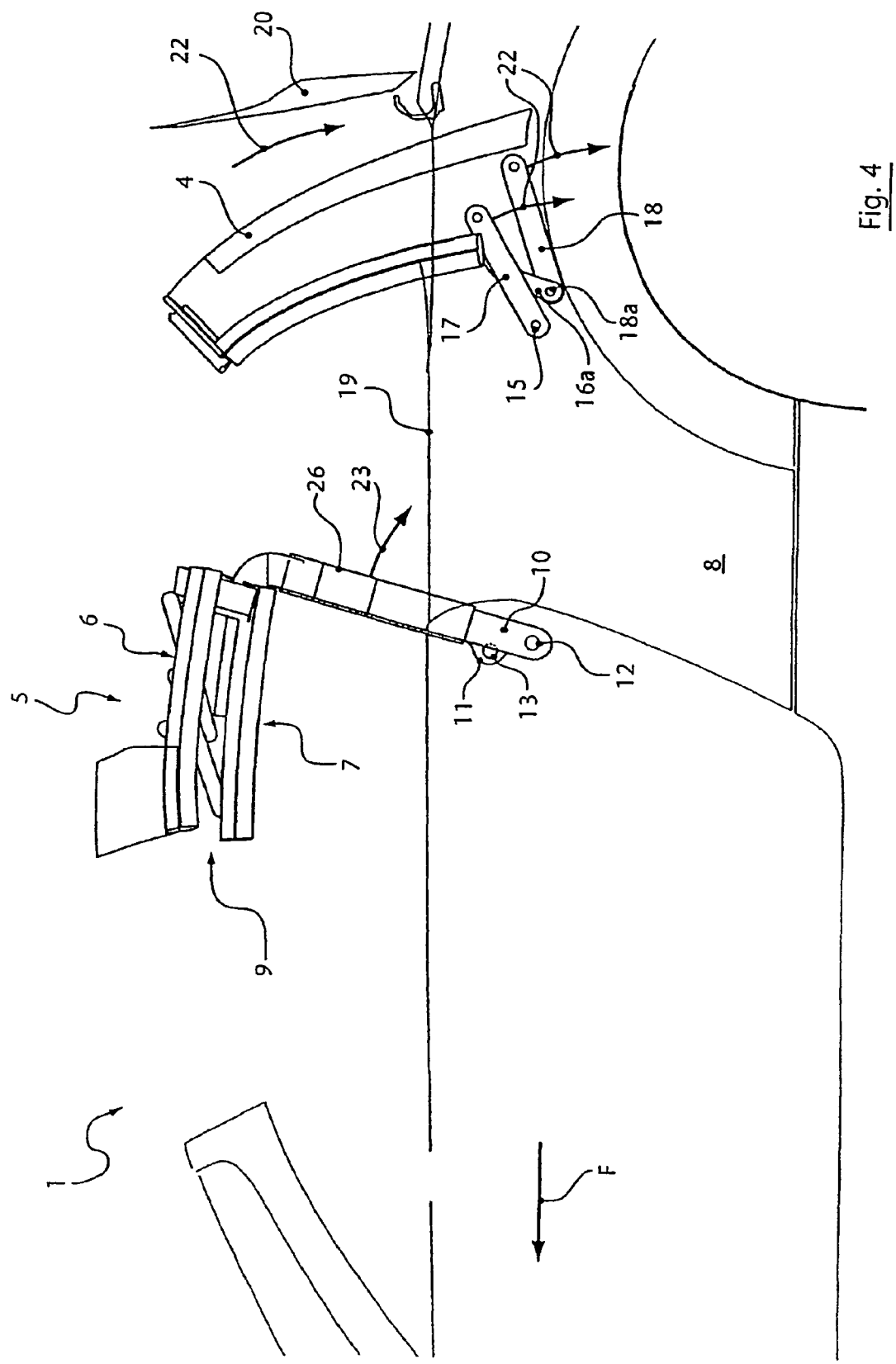
FIG. 4 shows a view similar to that of FIG. 3 during the opening movement of the rear roof part.
Figure 5:
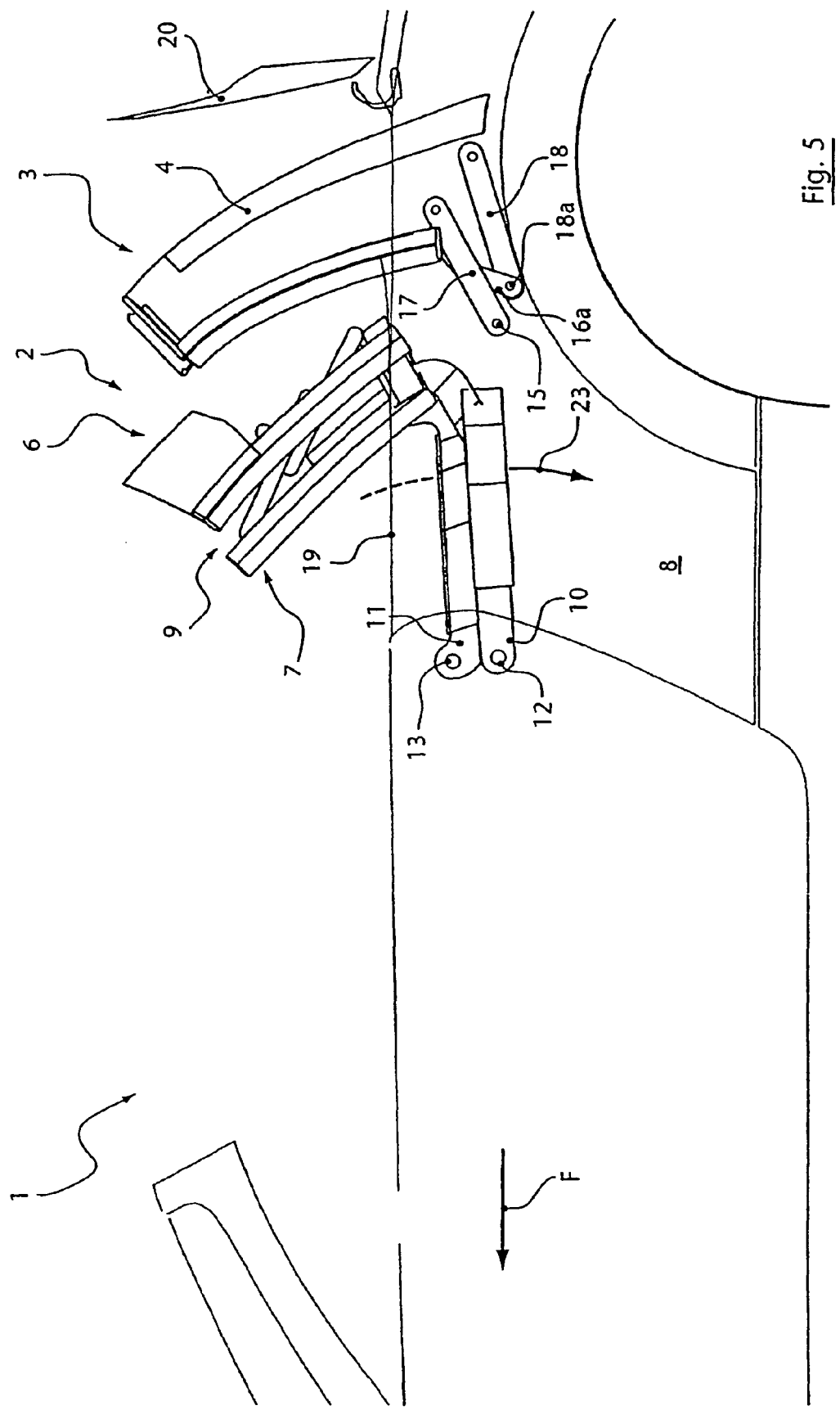
FIG. 5 shows a view similar to that of FIG. 4 during the lowering movement of the roof parts of the front roof section.
Figure 10:
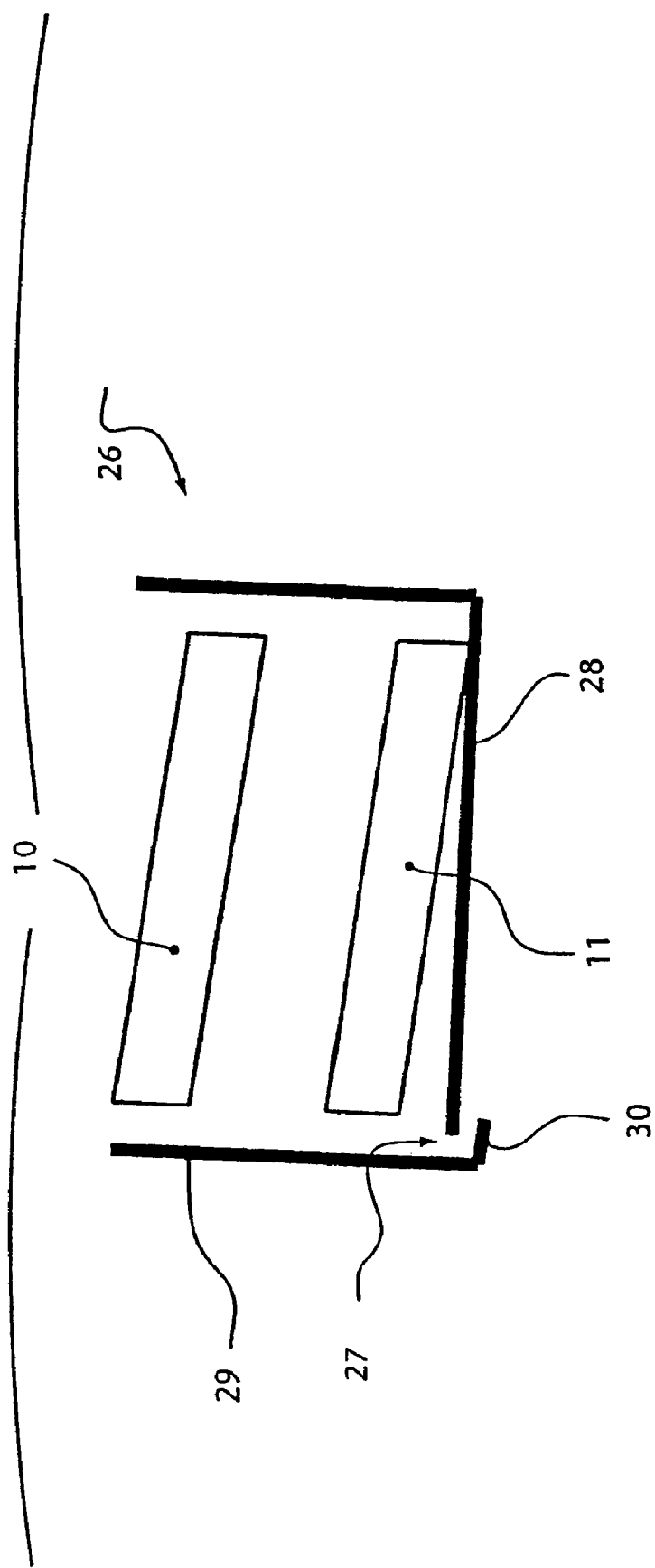
FIG. 10 shows a section along line X-X in FIG. 1.
Figure 11:
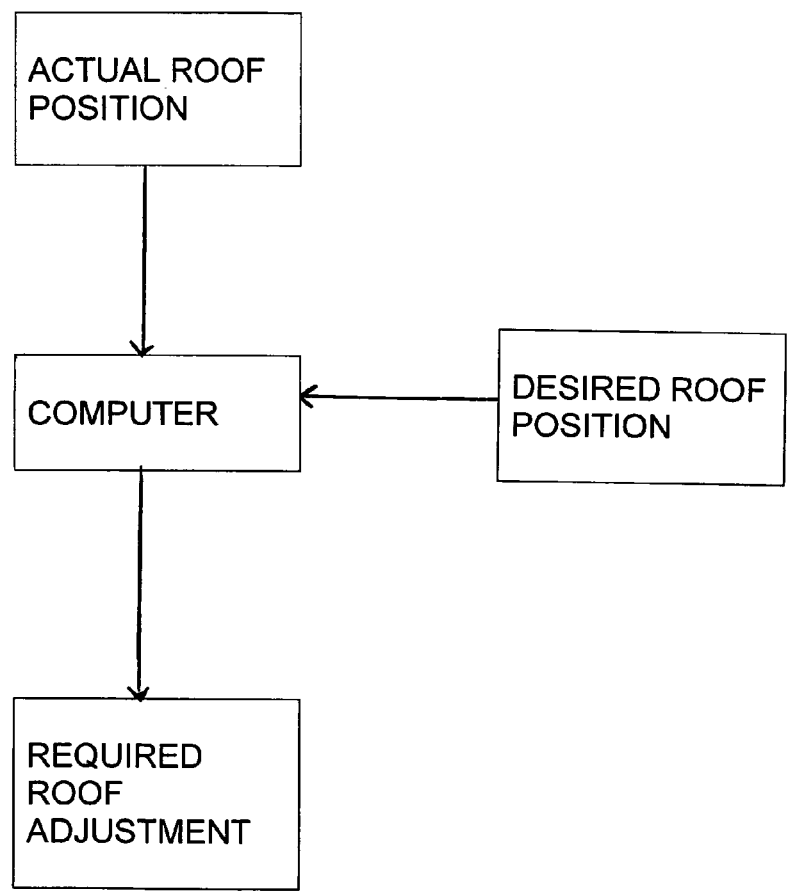
FIG. 11 is a schematic representation of a computer provided in the convertible of the invention with an input of a desired roof position and a route for arriving at the desired position of the roof parts.

In regard to the front roof section 5, the bearings 12, 13, which are fixed with respect to the automobile body, are arranged essentially vertically one above the other. As a result, the swivel arms 10, 11, which lie parallel face to face in the closed position of the roof 2, open relative to each other during the swiveling movement (transition from FIG. 4 to FIG. 5). Nevertheless, it is desirable to be able to ensure a common covering of the two swivel arms when the roof 2 is closed in order to improve the visual appearance of the interior and prevent the risk of injury. For this purpose, a two-part covering 26 (FIG. 10) is provided, which is divided at a separating line 27 parallel to the course of the swivel arms 10, 11. One part 28 of the covering 26 is arranged on the more inner swivel arm 11, and the other part 29 is arranged on the swivel arm 10. When the two swivel arms 10, 11 move apart during the opening of the roof, the covering parts 28, 29 can follow the respective swivel arms and yet ensure uniform covering when the roof 2 is in its closed position. In particular, a marginal projection 30 of one of the parts 28, 29 of the covering can overlap the separating line 27, which is then invisible when the roof is closed.

Both the front roof section 5 and the rear roof part 3 can be lowered inside the automobile body 8 below the belt line 19 independently of each other by means of the swivel arms 10, 11 and the links 17, 18, respectively.

In the illustrated embodiment, a folding-top compartment is located in the rear end of the automobile body 8. It has a cover 20, which is arranged approximately in the plane of the belt line 19 and swings open in the direction of arrow 21.

To open the roof 2 from its closed position (FIG. 1) to a completely opened full convertible position (FIG. 7), the front roof part 6 is first released from the windshield frame and moved over the roof part 7 located behind it (FIG. 2, FIG. 3). At the same time, the cover 20 of the folding-top compartment opens behind the rear roof part 3 to enlarge an opening for the passage of the roof 2.

In the position shown in FIG. 3, the front roof parts 6, 7 have been moved completely parallel one above the other by means of the four-bar linkage 9. A textile covering that may be present is raised from the rear roof part 7 of the front roof section 5 to provide sufficient clearance for the illustrated movement of the roof parts 6, 7. Due to the upwardly sloping shape of the roof parts 6, 7 relative to the longitudinal center plane of the vehicle, the front roof part 6 can overarch the more rearward roof part 7, so that the latter is held in the arch of the roof part 6, and a nested stack of roof parts 6, 7 is formed. This stack has a very small depth. It should also be noted that the cover 20 of the folding-top compartment is completely open in the position shown in FIG. 4.

The rear roof part 3 can then swivel by means of the links 17, 18 about the joints 15, 16 in the direction of arrow 22 and thus arrive in an almost vertical position (FIG. 4), in which a large region for the passage of the front roof parts 6, 7 is created in front of the roof part 3 that has been stood up in this way.

Figure 6:
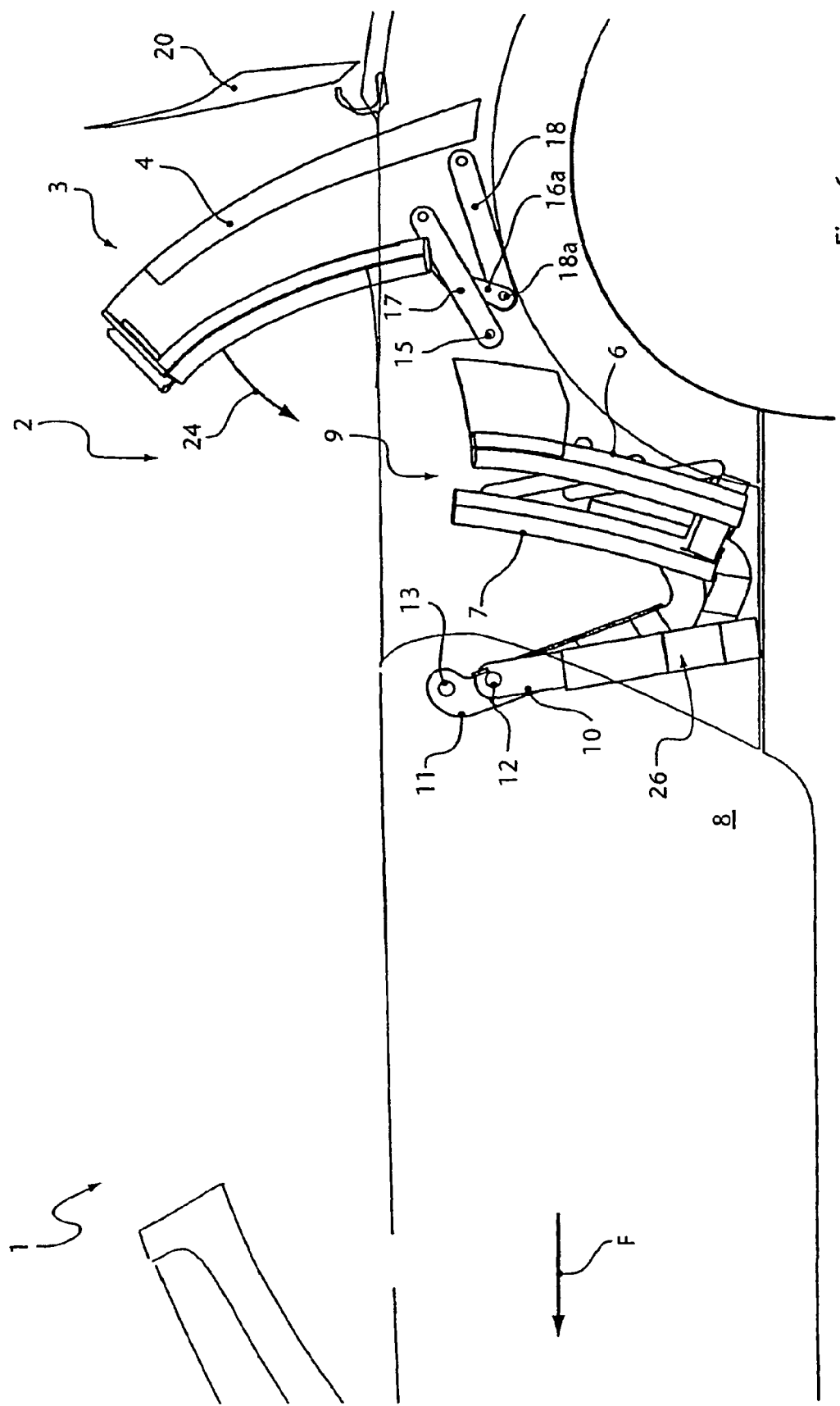
FIG. 6 shows a view similar to that of FIG. 5 with the roof parts of the front roof section completely lowered.

The front roof parts 6, 7 can then swivel downward by means of the swivel arms 10, 11 in the direction of movement 23 (FIG. 5) and finally arrive in the nearly vertical position inside the automobile body 8 that is illustrated in FIG. 6.

Upon further opening of the multijoint linkage 14 in the direction of arrow 22a, the rear roof part 3 can then swivel in the opposite direction of rotation (arrow 24) to arrive in a nearly horizontal position, in which it partially covers the space for the passage of the roof 2 through the plane of the belt line 19 and overlaps the stack of roof parts 6, 7, which has only a small height here. The invention thus makes it possible not only to hold the front roof section completely inside the automobile body 8 but also to reduce the dimension of the lowered roof 2 in the longitudinal direction of the vehicle, since the rear roof part no longer has to lie completely behind the lowered front roof section 5 but rather at least partly overlaps the front roof section 5. In addition, the nested stack comprising roof parts 6, 7 has a very small dimension in the longitudinal direction of the vehicle.

Figure 7:
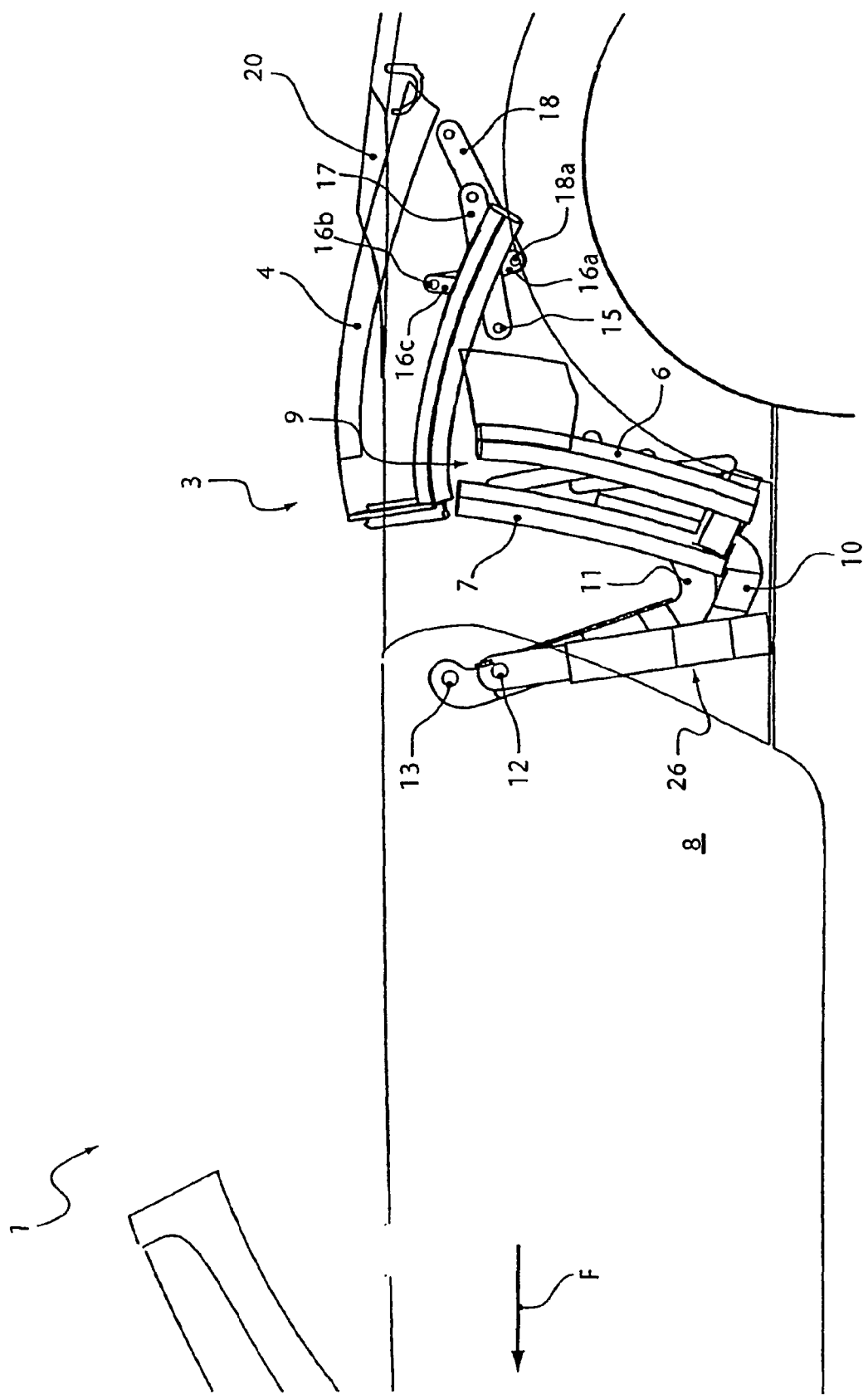
FIG. 7 shows the final position of the convertible with the roof completely open.

In the full convertible position shown in FIG. 7, the cover 20 of the folding-top compartment can also close back down over the rear roof part 3 that has been lowered in this way, so that a harmonious side line is obtained.

Alternatively, it is possible to have an embodiment in which the roof parts 6, 7 in their nested position are lowered horizontally beneath the rear roof part 3. In this case, in the final position of the lowered roof parts 6, 7, the curvature of the roof part 3 that closes over them would be in the same direction as the curvature of the stack of front roof parts 6, 7, so that, all together, the space requirement of the lowered roof 2 would also be small in this embodiment.

Figure 8:
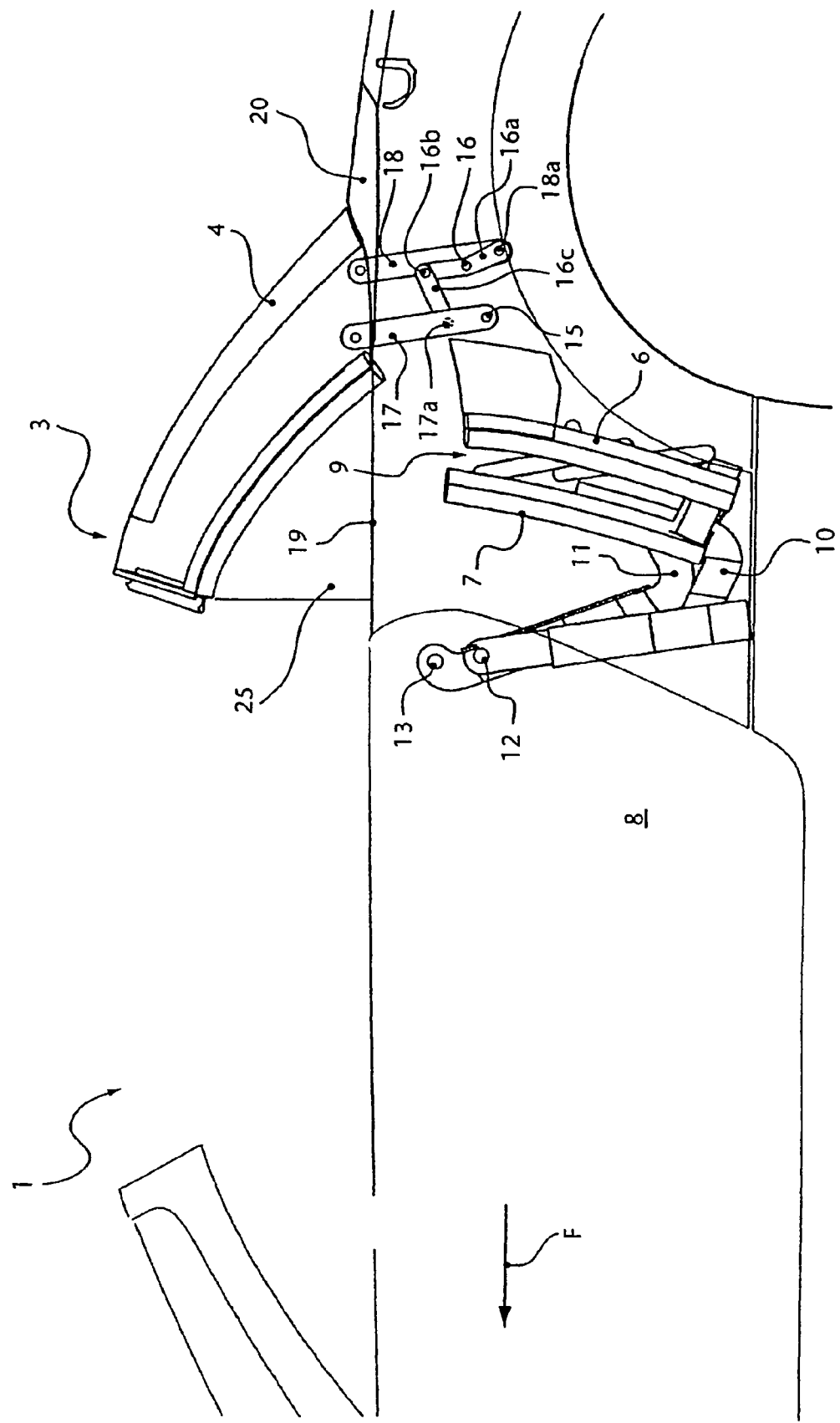
FIG. 8 shows a view similar to that of FIG. 7 with the rear roof part raised to create an opening for the passage of the roof parts of the front roof section.
Figure 9:
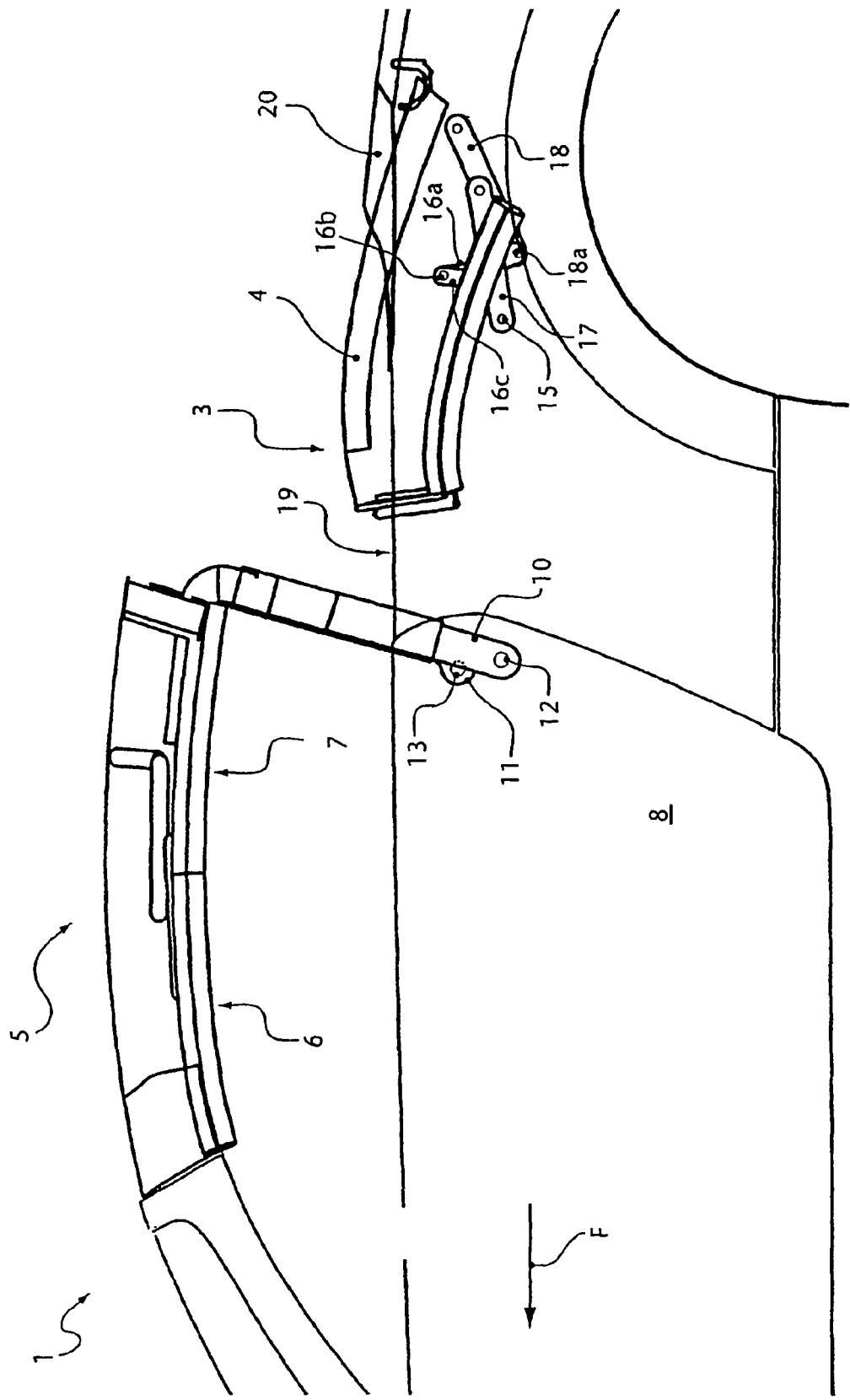
FIG. 9 shows a continuation of the sequence of movements according to FIG. 8 with the roof parts of the front roof section completely closed and with the rear roof part completely open to form a landau position of the roof.

FIGS. 8 and 9 show drawings of other suitable driving positions of the roof of the convertible vehicle 1.

In FIG. 8, the roof parts 6, 7 of the front roof section 5 are completely lowered, while the rear-roof part 3 is raised in the same position it occupies when the roof is closed, so that a targa vehicle is obtained. Rear quarter windows 25 that may be present can be closed in this position to help stabilize the rear roof part 3. Since the position of the rear roof part 3 corresponds to the closed position shown in FIG. 1, the cover 20 of the folding-top compartment can also be closed again. The targa position can be set directly from the position of the roof parts that is shown in FIG. 6 by swiveling the roof part 3 forward. It is also possible to set the roof to this position from the completely closed position of the roof (FIG. 1) or from the completely open position of the roof (FIG. 7).

Program logic can be provided, which allows the operator to preset the desired position of the roof and then automatically determines the current state of the roof and the most suitable route to the desired position. For this purpose, the various roof opening states can be visually shown on the dashboard, for example, in the form of separate operating buttons for the various roof states or in the form of a screen display. The desired roof position can then be automatically set by clicking on the desired position or by other means of operation.

In FIG. 9, the rear roof part 3 is lowered into the automobile body 8, while the front roof parts 6, 7 are in their closed position above the passenger compartment, so that a so-called landau position is obtained, in which, for example, a front row of seats is covered by the roof, and a rear row of seats is not covered by roof sections, or, in the case of a vehicle with only one row of seats, ventilation and sunshine can be admitted obliquely from the rear. The position shown in FIG. 9 can be set directly from the closed position that is shown in FIG. 1 by moving the rear roof part 3 in the opening direction, while the front roof parts 6, 7 are kept in the closed position.

At least four different roof positions—completely open, completely closed, targa position, and landau position—can thus be realized in the convertible 1 of the invention. Provision can also be made for the position in which the front roof parts 6, 7 are displaced one above the other. (FIG. 4) to be used as a driving position, in which case the front roof part 6 would be opened like a sunroof but over the entire width of the roof. Especially with the side windows lowered, a wide-open outdoor feeling would be produced, even with the rear roof part 3 closed.

The invention claimed is:

1. Convertible (1) with a roof (2) that comprises at least one rigid rear roof part (3), wherein the rear roof part (3) encloses a rear window (4) and can be moved and lowered inside the automobile body (8) independently of a roof section (5) arranged in front of it with respect to the direction of travel (F), wherein the roof section (5) arranged at the front with respect to the direction of travel (F) comprises at least two roof parts, (6; 7) arranged one behind the other in the closed position of the roof, which can be opened by moving one roof part at least partially over the other roof part and then lowering the roof parts in this nested state into the automobile body (8), wherein the at least two roof parts (6, 7) are connected to the automobile body through swivel arms (10, 11) located behind the front roof parts and below the rear roof part when the roof is closed, and wherein the roof parts (6; 7) of the front roof section (5) can be lowered into the automobile body in a nearly vertical position so as to be below a beltline of the automobile body, and when the rear roof part is opened, the rear roof part is lowered at least partially into the automobile body for providing space for passing the front roof parts therethrough, wherein a rear-most roof part of the front roof section, during opening, does not protrude above a height of the rear-most roof part in a closed position.

2. Convertible in accordance with claim 1, wherein each of the roof parts (6; 7) of the front roof section (5) has a rigid construction.

3. Convertible in accordance with claim 1, wherein the roof parts (6; 7) of the front roof section (5) are connected with each other by at least one four-bar linkage (9).

4. Convertible in accordance with claim 1, wherein a front most of the roof parts (6; 7) of the front roof section (5) can be moved independently of the rear roof part (3).

5. Convertible in accordance with claim 1, wherein in the lowered position of the front roof parts (6; 7), the rear roof part (3) is held in a position corresponding to its position in the closed state of the roof (2).

6. Convertible in accordance with claim 1, wherein in the lowered position of the front roof parts (6; 7), the rear roof part (3) can be lowered into the automobile body (8) in such a way that in its lowered position, it at least partially covers an opening for the upward passage of the roof (2).

7. Convertible in accordance with claim 6, wherein in the lowered position of the front roof parts (6; 7), the rear roof part (3) at least partially overlaps the front roof parts (6; 7).

8. Convertible in accordance with claim 1, wherein the roof parts (6; 7) of the front roof section (5) are movably supported on the automobile body (8) by said swivel arms (10; 11) on each side of the vehicle.

9. Convertible in accordance with claim 8, wherein in the closed position of the roof, the swivel arms (10; 11) of the roof parts (6; 7) of the front roof section (5) are aligned face to face and are surrounded by a common covering (26), which, however, are divided (27) parallel to an extension of the swivel arms (10; 11).

10. Convertible (1) in accordance with claim 1, wherein the roof parts (6; 7) are individually movable so as to allow several different, partial opening positions, and wherein the convertible contains a computer program product that allows the input of a desired roof position and then determines the current state of the roof position and a route for arriving at the desired position of the roof parts (3; 6; 7).

* * * * *